J. R. Martin.
Bee-Hive.
Nº 72308 Patented Dec. 17, 1867.
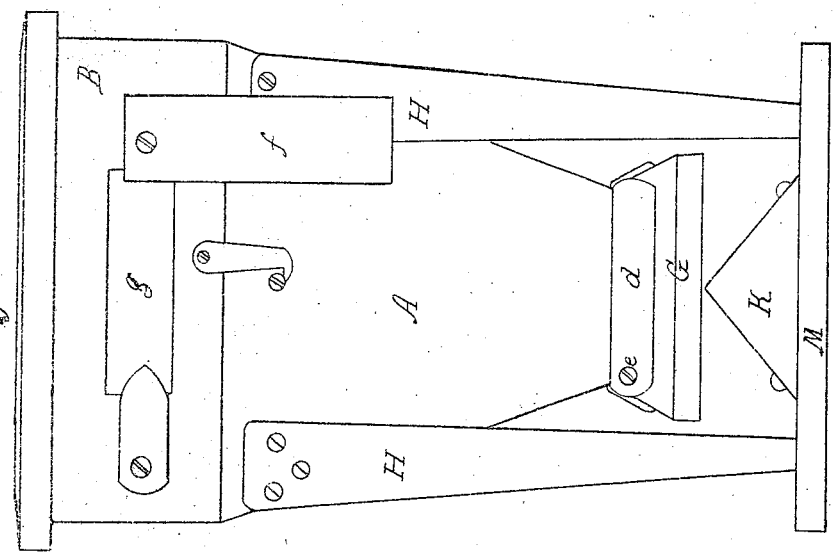
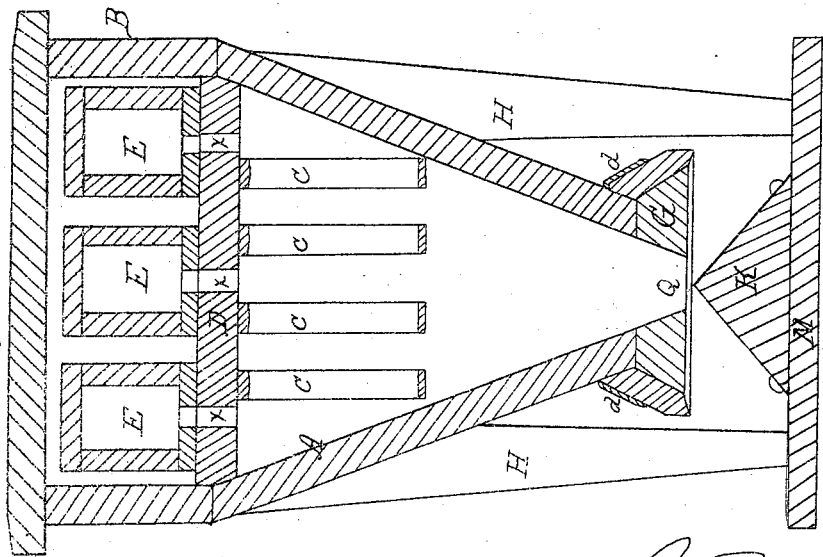
Witnesses
Inventor

United States Patent Office.

JOEL R. MARTIN, OF MARTINSBURG, INDIANA.

Letters Patent No. 72,308, dated December 17, 1867.

IMPROVEMENT IN BEE-HIVES.

*The Schedule referred to in these Letters Patent and making part of the same.*

TO ALL WHOM IT MAY CONCERN:

Be it known that I, JOEL R. MARTIN, of Martinsburg, in the county of Washington, and in the State of Indiana, have invented certain new and useful Improvements in Bee-Hives; and do hereby declare that the following is a full, clear, and exact description thereof, reference being had to the accompanying drawings, and to the letters of reference marked thereon, making a part of this specification.

The nature of my invention consists in the construction of the bee-hive in an economical form, whereby the same is self-cleansing, and to prevent the ingress of moth.

In the annexed drawings, A represents the hive, which is made in a square form at its top, and contracted at the end. Upon the hive is placed a hinged cover, B, which is also square, and of a size to suit the size of the hive. D represents the honey-board, which is made to fit neatly in the top of the hive, and at its bottom are attached the comb-frames C C, which project down into the body of the hive, but not to its bottom. This board has suitable perforations $x$ $x$ in it, to allow the passage of the bees up into the honey-boxes E E, which rest upon the board D. This hive has suitable ventilating-holes, while the cover has a glass window, $g$, which may be protected by the button $f$, whenever desired. Attached to the contracted bottom of the hive A is a block, G, made square in form, and having a square opening, $a$, in its centre, and bevelled to correspond with the shape of the interior of the hive. The exterior of this block is larger than the exterior of the lower point of the hive, and is provided with four cleats, (one on each square,) $d$ $d$, which are each connected to the block by a single screw, $e$, at one end. The hive is supported from the base M by four uprights, H H, so that the hive is elevated suitably above the ground and its base, as shown. This base may be upon stone or earth. On the centre of the base M is a pyramidal-shaped block, K, whose apex is directly beneath the hole $a$, in the bottom of the hive. This block is intended to allow the bees to freely pass into their hive, and prevent the moth from doing the same.

It will be understood that the moth cannot climb into the hive, but will fall down the pyramid, or the cleats $d$ $d$ may be swung on their pivots, so that their ends will project toward the base. Molasses or other suitable substance may then be placed upon the cleats, to attract the moth from the hive. By the peculiar shape of this hive, all dirt and foreign substance will slide down the interior after collecting there.

Having thus fully described my invention, what I claim as new, and desire to secure by Letters Patent, is—

1. The block G, connected to the end of the hive A, and provided with its cleats $d$ $d$, pivoted as set forth, and for the purposes described.

2. The combination of the hive A, as constructed, with block G, having cleats $d$ $d$, and supported by the standards H H above the pyramidal-shaped block K, all constructed and used for the purposes set forth.

In testimony that I claim the foregoing, I have hereunto set my hand, this 22d day of July, 1867.

JOEL R. MARTIN.

Witnesses:
JACOB WIRE,
JOHN SPEARS.